(12) United States Patent
Okumura et al.

(10) Patent No.: US 12,737,685 B2
(45) Date of Patent: Sep. 15, 2026

(54) CAUSE ESTIMATION SYSTEM, PROGRAM, AND MODEL CONSTRUCTION METHOD

(71) Applicant: Azbil Corporation, Tokyo (JP)

(72) Inventors: Daisuke Okumura, Tokyo (JP); Shigeki Ishii, Tokyo (JP)

(73) Assignee: Azbil Corporation, Tokyo (JP)

( * ) Notice: Subject to any disclaimer, the term of this patent is extended or adjusted under 35 U.S.C. 154(b) by 627 days.

(21) Appl. No.: 18/216,621

(22) Filed: Jun. 30, 2023

(65) Prior Publication Data

US 2024/0070535 A1 Feb. 29, 2024

(30) Foreign Application Priority Data

Aug. 31, 2022 (JP) ................................ 2022-137933

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS

2016/0348906 A1* 12/2016 Mori ....................... F23N 5/082
2017/0115005 A1* 4/2017 Chian .................. F24H 9/2035
2017/0219209 A1* 8/2017 Suzuki .................... F23N 1/042
2017/0276352 A1* 9/2017 Suzuki .................... F23N 5/203
2018/0266683 A1* 9/2018 Nishiyama ........... F23M 11/045
2020/0141653 A1* 5/2020 Kucera ..................... F23N 5/16
2020/0309372 A1* 10/2020 Watanabe ............. G01J 5/0018

FOREIGN PATENT DOCUMENTS

JP 2004-108694 A 4/2004
JP 2019-060572 A 4/2019
JP 2021-042948 A 3/2021

* cited by examiner

*Primary Examiner* — Maikhanh Nguyen

(57) ABSTRACT

A cause estimation system includes a training data acquisition unit that acquires training data in which sensing data is used as an explanatory variable and a flame failure detection cause is used as an objective variable, the sensing data being sensed by a combustion system during a predetermined time period preceding a time when a flame failure is detected based on a flame voltage indicating a main burner's flame state. The cause estimation system further includes a machine learning unit that performs machine learning based on the training data acquired and that constructs an estimation model in which a learning result is reflected, and a cause estimation unit that inputs sensing data sensed by the combustion system during a predetermined time period preceding a new flame failure detection timing into the estimation model and that acquires a new flame failure detection cause output from the estimation model.

6 Claims, 7 Drawing Sheets

79
Combustion Monitoring Device
10
11C
Cause Estimation Unit
11A
Training Data Acquisition Unit
11B
Machine Learning Unit
Estimation Model
ML

CAUSE ESTIMATION SYSTEM, PROGRAM, AND MODEL CONSTRUCTION METHOD

CROSS REFERENCE TO RELATED APPLICATIONS

This patent application claims the benefit of foreign priority to Japanese Patent Application No. JP 2022-137933 filed on Aug. 31, 2022, the disclosure of which is herein incorporated by reference in its entirety.

BACKGROUND OF THE INVENTION

The present disclosure relates to a cause estimation system, a program, and a model construction method for estimating a flame failure detection cause of a burner.

Japanese Patent Application Publication No. JP 2004-108694 A ("JP '694") discloses a technique of detecting a flame failure state based on values detected by a flame detector (thermocouple) and estimating a cause of a flame failure based on values detected during a predetermined time period before the flame failure state is detected. As causes of a flame failure, flame failures caused by blowing out or boiling over are disclosed.

BRIEF SUMMARY OF THE INVENTION

However, in the technique described in JP '694, since criteria for determining the cause of the flame failure are defined in advance, there may be a problem in the accuracy of the cause estimation.

An object of the present disclosure is to accurately estimate a flame failure detection cause.

In order to solve the above problem, a cause estimation system according to the present disclosure includes: a training data acquisition unit that acquires training data in which sensing data is used as an explanatory variable and a flame failure detection cause is used as an objective variable, the sensing data being sensed by a combustion system during a predetermined time period preceding, by a predetermined time, from a flame failure detection timing when a flame failure is detected based on flame state data indicating a flame state of a burner in the combustion system; a machine learning unit that performs machine learning based on the training data acquired by the training data acquisition unit and that constructs an estimation model in which a learning result is reflected; and a cause estimation unit that inputs sensing data sensed by the combustion system during a predetermined time period preceding, by the predetermined time, from a new flame failure detection timing into the estimation model and that acquires a new flame failure detection cause output from the estimation model.

As one example, the flame state data is a potential difference between both ends of a resistor through which a discharge current flows when a discharge tube of a flame detector discharges due to a flame of the burner, or a value obtained by integrating the discharge current, and the sensing data includes at least one of the flame state data and a flame level indicating discharge frequency of the flame detector.

As one example, the flame failure is detected when a value of the flame state data becomes less than a predetermined threshold value, the sensing data includes at least the flame state data, and the estimation model outputs the different causes depending on whether the value of the flame state data in the predetermined time period transitions within a predetermined range and/or whether the value of the flame state data transitions below a certain reference value.

As one example, the cause includes an erroneous detection cause when a flame failure is erroneously detected.

As one example, the training data acquisition unit acquires the training data from a plurality of combustion systems.

A program according to the present disclosure causes a computer to execute: a training data acquisition step of acquiring training data in which sensing data is used as an explanatory variable and a flame failure detection cause is used as an objective variable, the sensing data being sensed by a combustion system during a predetermined time period preceding, by a predetermined time, from a flame failure detection timing when a flame failure is detected based on flame state data indicating a flame state of a burner in the combustion system; a machine learning step of performing machine learning based on the training data acquired by the training data acquisition step and constructing an estimation model in which a learning result is reflected; and a cause estimation step of inputting sensing data sensed by the combustion system during a predetermined time period preceding, by the predetermined time, from a new flame failure detection timing into the estimation model and acquiring a new flame failure detection cause output from the estimation model.

A model construction method according to the present disclosure is a model construction method executed by a model construction device that performs machine learning and that constructs an estimation model, and includes: a training data acquisition step of acquiring training data in which sensing data is used as an explanatory variable and a flame failure detection cause is used as an objective variable, the sensing data being sensed by a combustion system during a predetermined time period preceding, by a predetermined time, from a flame failure detection timing when a flame failure is detected based on flame state data indicating a flame state of a burner in the combustion system; and a machine learning step of performing machine learning based on the training data acquired by the training data acquisition step and constructing an estimation model in which a learning result is reflected.

According to the present disclosure, the flame failure detection cause can be accurately estimated.

DETAILED DESCRIPTION OF THE INVENTION

Hereinafter, an embodiment of the present disclosure and modifications thereof will be described with reference to the drawings.

Embodiment

Figure 1:
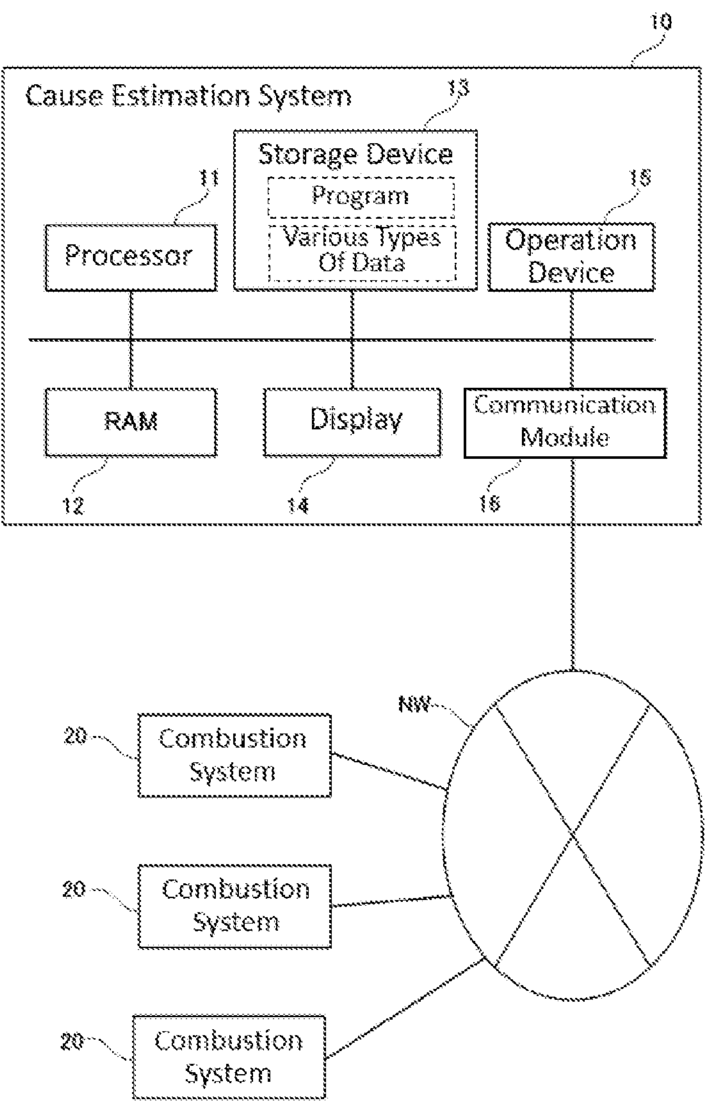
FIG. 1 is a configuration diagram of a cause estimation system according to an embodiment of the present disclosure.

As shown in FIG. 1, a cause estimation system 10 according to one embodiment of the present disclosure can communicate with a plurality of combustion systems 20 via a communication network NW. The cause estimation system 10 estimates a flame failure detection cause when any one of the plurality of combustion systems 20 detects a flame failure. An estimation model ML (FIG. 4), which will be described later, is used for the cause estimation. The combustion systems 20 will be described below, and then the cause estimation system 10 will be described. Since the plurality of combustion systems 20 have similar configurations, one of the combustion systems 20 will be described below.

Figure 2:
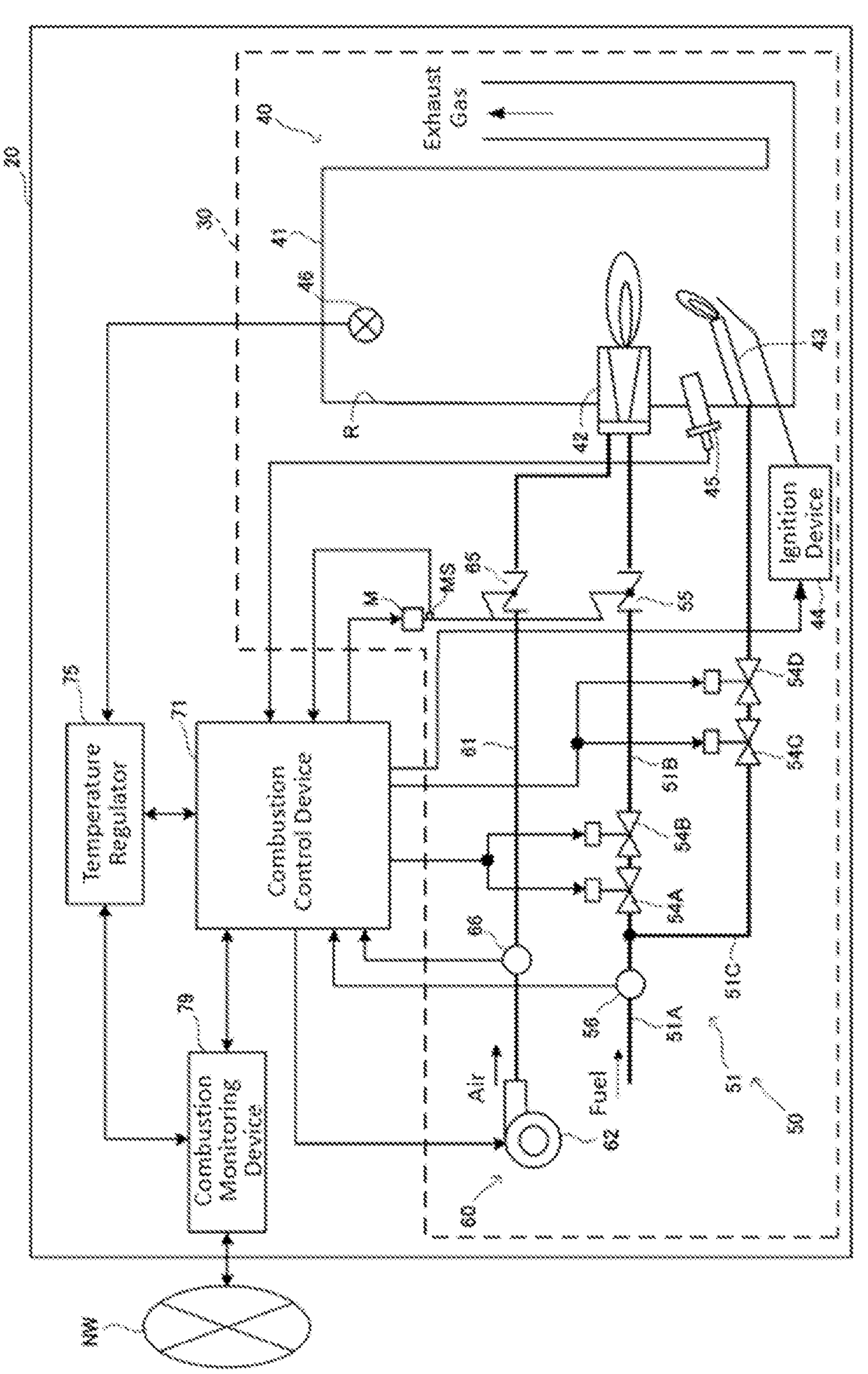
FIG. 2 is a configuration diagram of a combustion system communicating with the cause estimation system in FIG. 1.

As shown in FIG. 2, the combustion system 20 includes a combustion device 30 that performs combustion, a combustion control device 71 that controls the combustion device 30, a temperature regulator 75 that gives various instructions to the combustion control device 71, and a combustion monitoring device 79. The plurality of combustion systems 20 in this embodiment have a similar configuration.

The combustion device 30 includes a combustion equipment 40, a fuel supply system 50, an air supply system 60, a control motor M, and an opening degree sensor MS.

The combustion equipment 40 burns a fuel gas inside a combustion chamber R. The combustion equipment 40 includes a combustion furnace 41 that forms the combustion chamber R, a main burner 42 that burns the fuel gas to heat the inside of the combustion chamber R, a pilot burner 43 that burns fuel to light the main burner 42, and an ignition device (igniter) 44 that ignites the pilot burner 43.

The combustion equipment 40 further includes a flame detector 45 that detects a flame of the main burner 42 and the pilot burner 43, and a thermometer 46 that detects a temperature inside the combustion chamber R. The flame detector 45 detects the flame by detecting electromagnetic waves (for example, ultraviolet rays) radiated from the flame of the main burner 42 or the pilot burner 43.

The fuel supply system 50 supplies the fuel gas from the outside to the combustion equipment 40. The fuel supply system 50 includes a fuel flow path 51 through which the fuel gas supplied to the combustion equipment 40 flows. The fuel flow path 51 includes a main flow path 51A to which the fuel gas is supplied from the outside, and a first flow path 51B and a second flow path 51C that are branched from the 96859/0151 main flow path 51A. The first flow path 51B is connected to the main burner 42, and the second flow path 51C is connected to the pilot burner 43.

The fuel supply system 50 further includes main valves 54A and 54B provided in the first flow path 51B, and pilot valves 54C and 54D provided in the second flow path 51C. The main valves 54A and 54B open and close the first flow path 51B. The pilot valves 54C and 54D open and close the second flow path 51C. The fuel supply system 50 further includes a damper 55 that is provided in the main flow path 51A and used to adjust a fuel flow rate, and a fuel flow meter 56 that detects a flow rate of the fuel flowing through the first flow path 51B, that is, supplied to the main burner 42.

The air supply system 60 supplies air to the combustion equipment 40. The air supply system 60 includes an air flow path 61 that supplies the air to the main burner 42 of the combustion equipment 40 and a blower 62 that causes the air to flow through the air flow path 61. The air supply system 60 further includes a damper 65 that is provided in the air flow path 61 and used to adjust an air flow rate, and an air flow meter 66 that detects a flow rate of the air flowing through the air flow path 61, that is, supplied to the main burner 42.

The damper 55 used to adjust the fuel flow rate and the damper 65 used to adjust the air flow rate are operated by the control motor M to control opening degrees of the fuel flow path 51 (first flow path 51B) and the air flow path 61. The dampers 55 and 65 operate in cooperation by a linkage mechanism. Accordingly, the opening degrees of the dampers 55 and 65 are interlocked. The dampers 55 and 65 may operate in cooperation by other configurations. For example, the damper 65 may be a pressure equalizing valve into which an air pressure in the air flow path 61 of the air supply system 60 is introduced. The damper 65, which is a pressure equalizing valve, operates such that the air pressure in the air flow path 61 and a fuel pressure in the first flow path 51B of the fuel flow path 51 are made uniform.

The opening degrees of the dampers 55 and 65 are interlocked such that a fuel-air ratio, which is a ratio of the fuel and the air supplied to the main burner 42, is maintained at a desired ratio. Amounts of the fuel and the air supplied to the main burner 42 are adjusted by the opening degrees of the dampers 55 and 65, thereby adjusting a flame state, more specifically, a flame strength of each burner. As a result, a heating temperature is controlled under which the combustion chamber R or a workpiece provided in the combustion chamber R is heated.

The control motor M is provided with the opening degree sensor MS that detects the opening degrees of the dampers 55 and 65 by detecting rotation angles of a rotating shaft or the like. The opening degrees detected by the opening degree sensor MS are used as feedback values when the control motor M is feedback-controlled to control the opening degrees of the dampers 55 and 65.

The combustion control device 71 includes various computers such as a programmable logic controller (PLC) and a personal computer. The combustion control device 71 may also include central processing units (CPUs) that constitute the computers, as well as various circuits (analog circuits and the like) capable of implementing operations described later. The combustion control device 71 is also referred to as a burner controller.

Figures 3, 4:
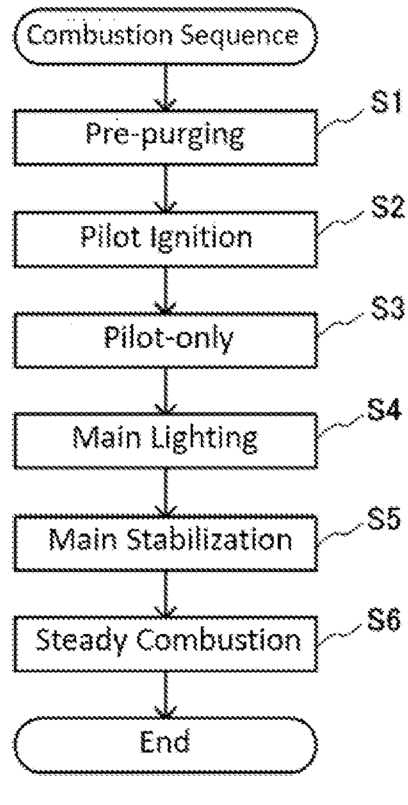
FIG. 3 is a flowchart of a combustion sequence executed by a combustion control device.
FIG. 4 is a configuration diagram of the cause estimation system.

The combustion control device 71 controls the combustion device 30 according to a predetermined combustion sequence in FIG. 3 in order to heat the inside of the combustion chamber R. It is assumed that the valves 54A to 54D of the fuel supply system 50 are closed at the start of the combustion sequence.

During pre-purging (step S1), the combustion control device 71 drives the control motor M, controls the damper 65 to a high opening degree position, and operates the blower 62 of the air supply system 60. Accordingly, fresh air is blown into the combustion chamber R via the main burner 42.

After the pre-purging, the combustion control device 71 performs pilot ignition (step S2). During the pilot ignition, the combustion control device 71 first controls the dampers 55 and 65 to a low opening degree position. Then, the combustion control device 71 controls the pilot valves 54C and 54D of the fuel supply system 50 to an open state to start supplying the fuel to the pilot burner 43, and operates the ignition device 44 to generate an ignition spark. Accordingly, the pilot burner 43 is ignited. When the flame detector 45 detects ignition of the pilot burner 43, the combustion control device 71 executes pilot-only (step S3). During the pilot-only, the combustion control device 71 is on standby for a predetermined time period to stabilize the flame of the pilot burner 43.

After the pilot-only, the combustion control device 71 performs main lighting (step S4) in which the main valves 54A and 54B of the fuel supply system 50 are controlled to an open state to start supplying the fuel to the main burner 42. Accordingly, the main burner 42 is lighted using the flame of the pilot burner 43 as seed light. After a certain time period has elapsed since the main valves 54A and 54B are controlled to the open state, the combustion control device 71 determines that the main lighting is completed and executes main stabilization (step S5). During the main stabilization, the pilot valves 54C and 54D of the fuel supply system 50 are closed and the flame of the pilot burner 43 is extinguished. Furthermore, during the main stabilization, a standby is also performed for the flame of the main burner 42 to stabilize.

After the main stabilization, the combustion control device 71 shifts to steady combustion (step S6). The inside of the combustion chamber R is heated by steady combustion of the main burner 42. During the steady combustion, the combustion control device 71 controls the opening degrees of the dampers 55 and 65 via the control motor M to control flow rates of the air and the fuel to the main burner 42, and accordingly controls firepower, that is, the flame state of the main burner 42. The combustion control device 71 closes the main valves 54A and 54B of the fuel supply system 50 to extinguish the flame of the main burner 42 at a timing of the end of the steady combustion. A post-purge may be performed after the steady combustion.

Returning to FIG. 2, during the steady combustion, the temperature regulator 75 uses a temperature detected by the thermometer 46 as a feedback value to instruct the combustion control device 71 to bring the temperature inside the combustion chamber R to a target temperature. The temperature regulator 75 gives instructions on the flow rates of the fuel and the air during the steady combustion, and the like, based on a relationship between the feedback value and the target temperature. The combustion control device 71 sets target opening degrees of the dampers 55 and 65 based on the instructed flow rates, and performs feedback control on the control motor M using the opening degrees from the opening degree sensor MS as feedback values. The combustion control device 71 may control the opening degrees and the flow rates by feedback control using, as feedback values, the amounts of the fuel and the air supplied to the main burner 42 detected by the flow meters 56 and 66.

The flame detector 45 provided in the combustion equipment 40 includes a discharge tube (for example, an ultraviolet ray tube) that discharges when receiving electromagnetic waves (for example, ultraviolet rays) radiated from a flame. A discharge current generated by the discharge is input to the combustion control device 71.

The combustion control device 71 integrates a potential difference (potential difference for a predetermined time period) between both ends of any resistor through which the discharge current from the flame detector 45 flows to generate a flame voltage FV (a flame current obtained by integrating a current value of the discharge current may be used; the same applies hereinafter) representing a flame state. This integration is performed by, for example, an integration circuit. The flame voltage FV has a voltage value that varies between 0 V and 5 V. In the above combustion sequence and the like, the combustion control device 71 monitors the flame voltage FV. The combustion control device 71 detects the presence (lighting or ignition) of a flame when the flame voltage FV becomes a predetermined threshold value FVth or more. The combustion control device 71 detects flame extinguishment when the flame voltage FV becomes less than the threshold value FVth. Here, the time when the flame voltage FV becomes less than the threshold value FVth means a time when the flame voltage FV becomes less than the threshold value FVth for a time period longer than or equal to a predetermined time period (also referred to as a flame response time) preset in the CPU and the like of the combustion control device 71. That is, the combustion control device 71 detects the extinguishment on condition that the time period during which the flame voltage FV is less than the threshold value FVth reaches the flame response time. Extinguishment means that the flame is extinguished. The extinguishment includes extinguishment caused by closing the main valves 54A and 54B and a flame failure caused by unintentional extinguishment of a flame while the main valves 54A and 54B are open.

When the flame voltage FV becomes less than the threshold value FVth and the extinguishment is detected in subsequences such as main stabilization and steady combustion of the combustion sequence, the combustion control device 71 determines that a flame failure is detected and supplies a close signal for closing a valve to the main valves 54A and 54B. Accordingly, the supply of the fuel gas is stopped. Different threshold values may be used for detecting the presence of the flame and for detecting the flame extinguishment.

Furthermore, the combustion control device 71 generates a discharge pulse signal (for example, a voltage signal) that indicates discharge based on the potential difference (or the current value of the discharge current, or the like) between both ends of any resistor through which the discharge current from the flame detector 45 flows. The combustion control device 71 generates a flame level FL, which is a numerical value indicating discharge frequency of the discharge tube of the flame detector 45, from the discharge pulse signal. Specifically, the combustion control device 71 counts, based on the discharge pulse signal, the number of discharge pulses per certain time (for example, 0.1 seconds), that is, the number of discharge times N. The combustion control device 71 derives the flame level FL based on the counted number of discharge times N. The method for deriving the flame level FL can be any method, and here the flame level FL is derived by the following Equation (1). In the equation, Nmax is the maximum number of discharge times per the certain time described above.

$$FL=(N/N\max)*100 \tag{1}$$

Here, the flame level FL is represented by percentage, but it may also be represented by N/Nmax or N only. The usage of the flame level FL will be described later.

Both the flame voltage FV and the flame level FL are numerical values that indicate the flame state (intensity here). Since the flame voltage FV is a value obtained by the above integration, responsiveness of the flame voltage FV to changes (changes in an ultraviolet ray amount or discharge current) in the flame is slower than that of the flame level FL. Accordingly, even if flame lifting or flame flashback occurs, causing temporary interruption of the electromagnetic waves incident on the flame detector 45, the flame voltage FV does not fall below the threshold value FVth, which is a criterion for determining the extinguishment, for the flame response time or longer. In other words, the flame voltage FV and the flame response time are generated or set so as not to erroneously detect the above lifting or the like as extinguishment (particularly flame failure). On the other hand, the flame level FL can be used to detect the above lifting. In this way, the flame voltage FV and the flame level FL have advantages and disadvantages.

The combustion monitoring device 79 includes various computers such as a personal computer. The combustion monitoring device 79 functions as a data collector that communicates with the combustion control device 71 and the temperature regulator 75, and that periodically (for example, every 0.1 seconds) and sequentially acquires, from the combustion control device 71 and the temperature regulator 75, the various types of sensing data sensed by the combustion system 20 in real time. The sensing data includes at least one of the flame level FL, the flame voltage FV, the temperature detected by the thermometer 46, the fuel flow rate and the air flow rate detected by the flow meters 56 and 66, and the like. The fuel flow rate and the air flow rate may be represented by valve opening degrees detected by the opening degree sensor MS.

The combustion monitoring device 79 records the sequentially acquired sensing data in a storage unit along with sensing times of the sensing data in chronological order. As the sensing times, the combustion monitoring device 79 may acquire times when the sensing data is acquired, or acquire times given as time stamps to the sensing data on a transmission source side such as the combustion control device 71. The sensing data may be recorded in the storage unit from the present back to a latest certain time period.

The combustion monitoring device 79 communicates with the combustion control device 71 and monitors a flame failure detection timing of the combustion control device 71. When a flame failure is detected, the combustion monitoring device 79 acquires sensing data stored in the storage unit and sensed within a predetermined time period preceding, by a predetermined time (for example, three minutes), from the flame failure detection timing. The sensing data within the predetermined time period may be identified based on the sensing times stored in the storage unit together with the sensing data. The combustion monitoring device 79 supplies the acquired sensing data to the cause estimation system 10 via the communication network NW together with an inquiry about the flame failure detection cause.

Next, the cause estimation system 10 in FIG. 1 will be described. The cause estimation system 10 includes a processor 11 such as a CPU, a random access memory (RAM) 12 that functions as a main memory of the processor 11, and a non-volatile storage device 13 that stores programs executed by the processor 11. The storage device 13 also stores various types of data used in the following processes, data (such as coefficients and/or weights) constituting the estimation model ML, which will be described later, and the like. The cause estimation system 10 further includes a display 14 that displays various screens, an operation device 15 that receives operation input, and a communication module 16 connected to the communication network NW.

The processor 11 operates as a training data acquisition unit 11A, a machine learning unit 11B, a cause estimation unit 11C, and the estimation model ML shown in FIG. 4 by executing the programs stored in the storage device 13.

The estimation model ML receives the sensing data sensed by the combustion system 20 during a predetermined time period preceding, by the predetermined time, from the flame failure detection timing and outputs the flame failure detection cause. There is a causal relationship between the flame failure detection cause and sensing data transition within the predetermined time period, and this causal relationship is reflected in the estimation model ML. The estimation model ML is initially constructed by any method, and then reconstructed by machine learning using training data, which will be described later. In other words, a new estimation model ML is constructed based on the training data, which will be described later. Accordingly, the estimation accuracy of the estimation model ML is improved. The estimation model ML may be any type of model such as a neural network model, a support vector machine model, or a random forest model.

One estimation model ML is used for the combustion systems 20 of the same type, for example, including at least the same specifications of the combustion device 30 described later. Therefore, when a plurality of combustion systems 20 include a plurality of different types of combustion systems, an estimation model ML is prepared and used for each type. Here, for convenience of the description, it is assumed that the plurality of combustion systems 20 are of the same type and one estimation model ML is used.

Flame failure detection causes handled by the estimation model ML include not only an actual cause of the flame failure, but also an erroneous detection cause when the flame failure is erroneously detected due to a malfunction of the flame detector 45, and the like, although there is no actual flame failure.

Figure 5:
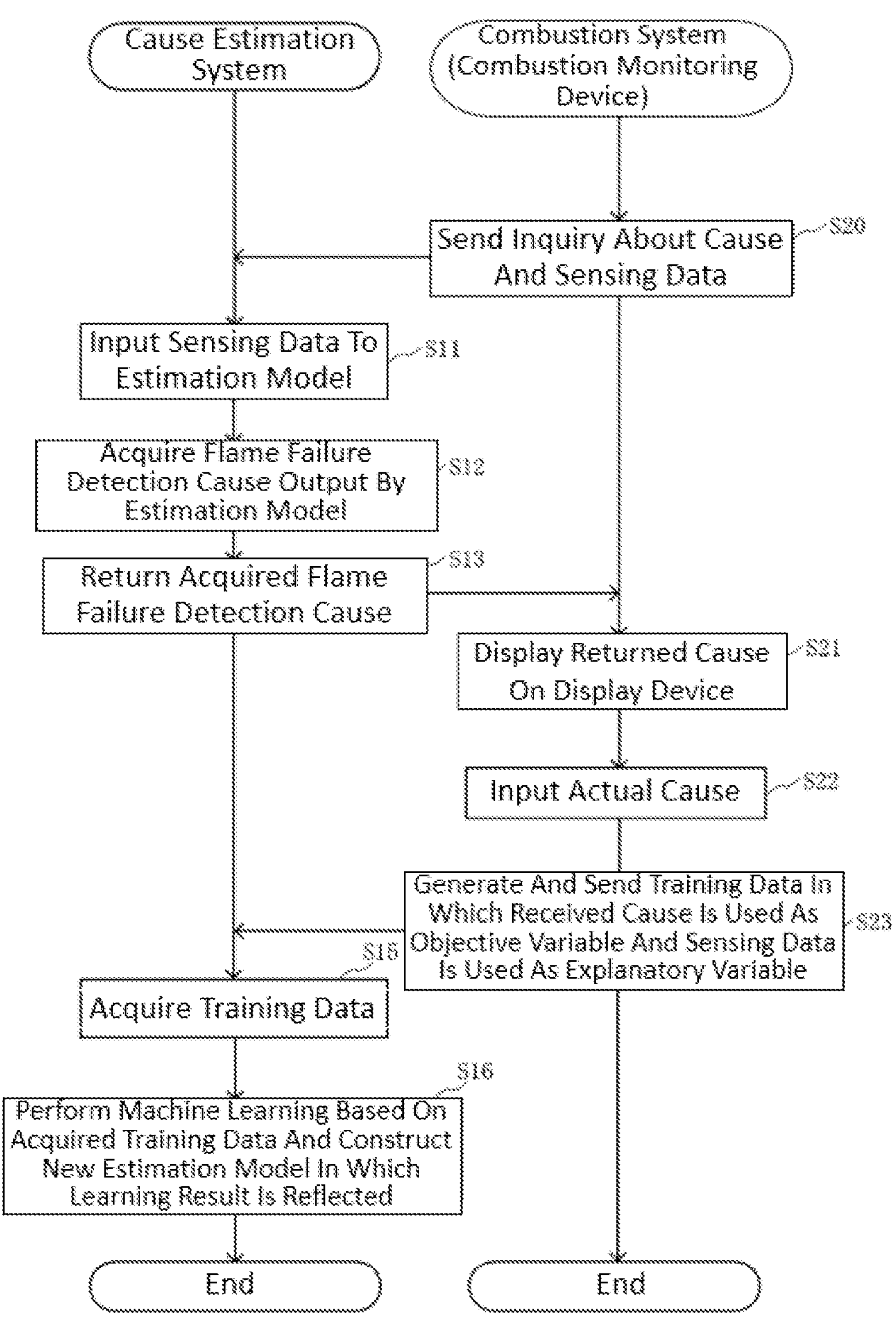
FIG. 5 is a flowchart of estimation and machine learning for flame failure detection.

Next, operations of the training data acquisition unit 11A, the machine learning unit 11B, and the cause estimation unit 11C will be described with reference to FIG. 5.

First, the cause estimation unit 11C inputs sensing data (step S20) supplied from the combustion monitoring device 79 together with an inquiry about a flame failure detection cause to the estimation model ML (step S11). The estimation model ML estimates and outputs the flame failure detection cause based on the sensing data. The cause estimation unit 11C acquires the flame failure detection cause output by the estimation model ML (step S12).

Figure 6:
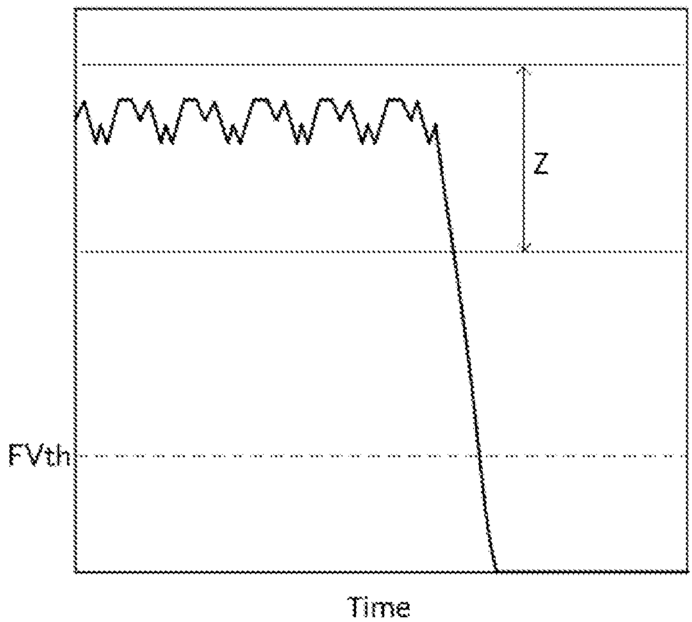
FIG. 6 is a graph showing flame voltage transition.
Figure 7:
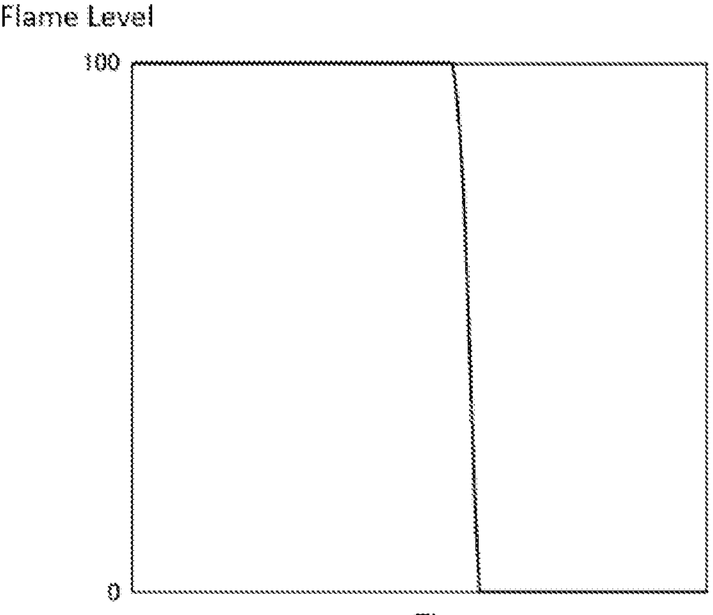
FIG. 7 is a graph showing flame level transition.
Figure 8:
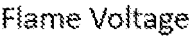
FIG. 8 is a graph showing the flame voltage transition.
Figure 8:
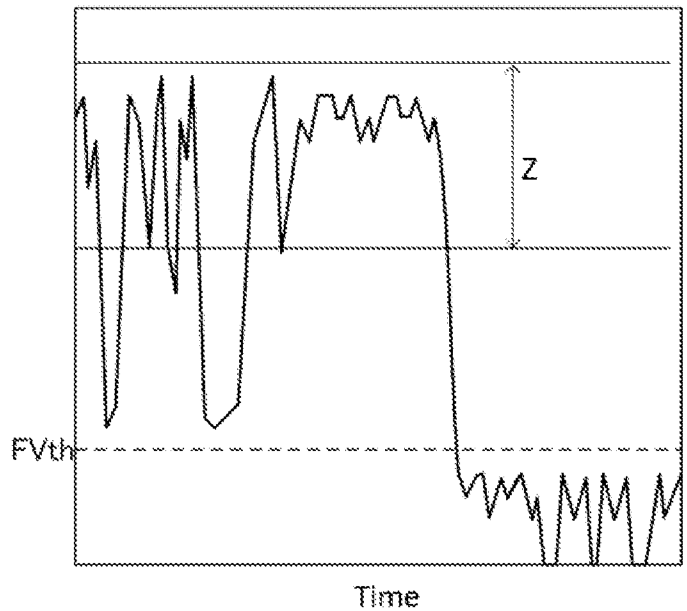

When, of the flame voltage FV and the flame level FL that serve as the sensing data input to the estimation model ML, the flame voltage FV stably transitions within a predetermined range Z before a flame failure detection timing (for example, a timing when the flame voltage FV falls below the threshold value FVth longer than the flame response time) (the flame voltage FV at this time is shown in FIG. 6, and the flame level FL at this time is shown in FIG. 7), flame extinguishment or faulty detection of a discharge current is conceivable. In this case, the estimation model ML outputs, as candidates for the cause, an unintentional closed state of the main valves 54A and 54B, a wiring abnormality between the flame detector 45 and the combustion control device 71, a failure of a circuit that derives the flame voltage FV or the like of the combustion control device 71, a sudden fuel-air ratio abnormality, and a fuel and/or air flow velocity abnormality. In addition to or instead of the flame voltage FV, the flame level FL may be compared with a predetermined range.

When, of the flame voltage FV and the flame level FL that serve as the sensing data input to the estimation model ML, the flame voltage FV is not within the predetermined range Z and unstably transitions before the flame failure detection timing (the flame voltage FV at this time is shown in FIG.

Figure 9:
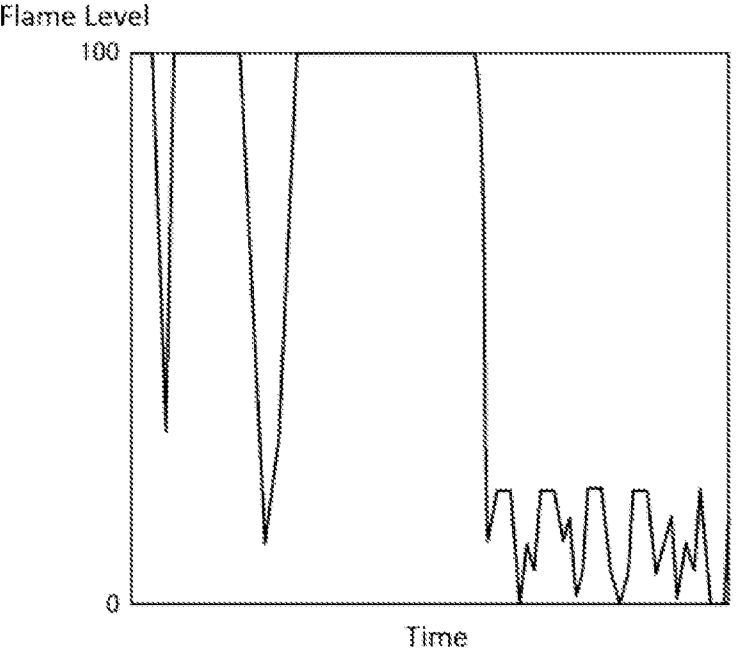
FIG. 9 is a graph showing the flame level transition.

8, and the flame level FL at this time is shown in FIG. 9), flame swing or lifting or instability of the flame detector 45 is conceivable. In this case, the estimation model ML outputs, as candidates for the cause, a sudden fuel-air ratio abnormality, a sudden fuel and/or air flow velocity abnormality, deterioration of a discharge surface of the discharge tube of the flame detector 45, and leakage of a sealed gas in the discharge tube. In addition to or instead of the flame voltage FV, the flame level FL may be compared with a predetermined range.

Figure 10:
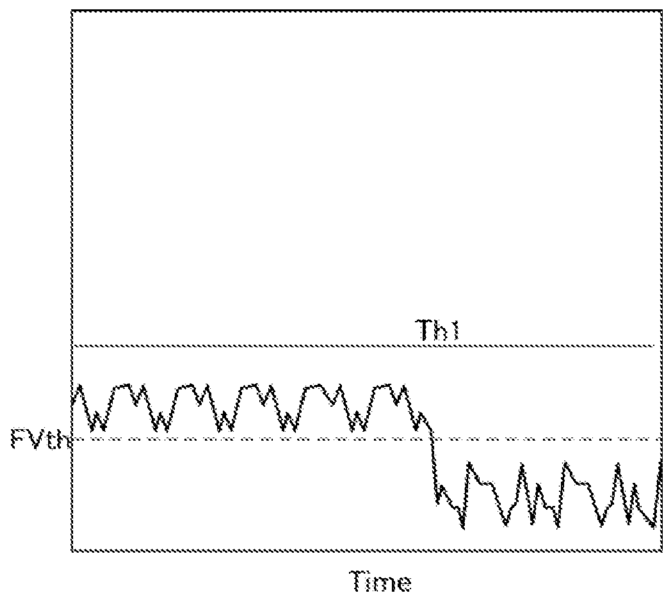
FIG. 10 is a graph showing the flame voltage transition.
Figure 11:
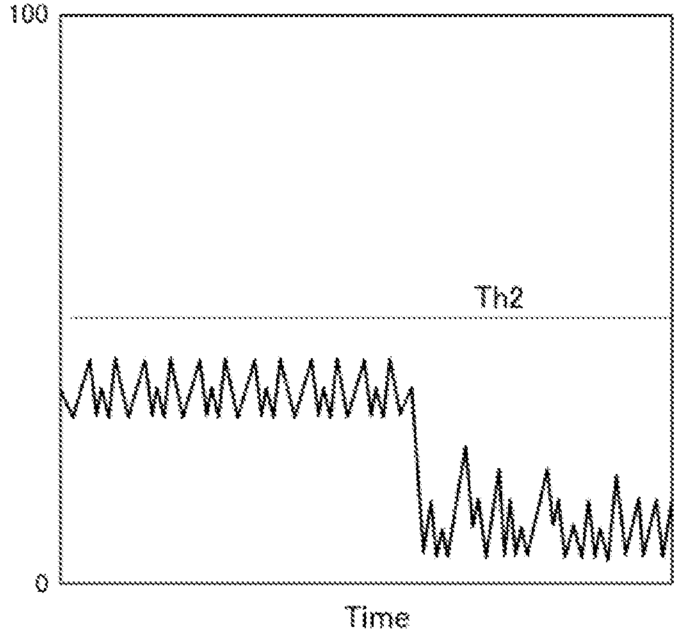
FIG. 11 is a graph showing the flame level transition.

When the flame voltage FV and the flame level FL that serve as the sensing data input to the estimation model ML transition at a low value of certain reference values Th1 and Th2 or less before the flame failure detection timing (see FIGS. 10 and 11), flame failure erroneous detection due to the fact that the flame voltage FV and the flame level FL are chronically low is conceivable. In the case described above, the flame voltage FV may be lower than the threshold value FVth for a time period shorter than the flame response time before the flame failure detection timing. When the flame voltage FV and the flame level FL transition at the low values, the estimation model ML outputs, as candidates for the cause, a chronic fuel-air ratio abnormality, a chronic fuel and/or air flow velocity abnormality, deterioration of a discharge surface of the discharge tube of the flame detector 45, leakage of a sealed gas in the discharge tube, and dirt on a window that allows ultraviolet rays to pass through the discharge tube of the flame detector 45.

Of the flame voltage FV and the flame level FL, the former may be input to the estimation model ML alone. However, since the flame voltage FV and the flame level FL differ in responsiveness to the changes in the flame as described above, the flame voltage FV and the flame level FL are input to the estimation model ML, thereby improving the cause estimation accuracy.

The cause estimation unit 11C returns the flame failure detection cause acquired from the estimation model ML to the combustion monitoring device 79 of the combustion system 20 that has sent the sensing data (step S13).

The combustion monitoring device 79 displays the returned cause on any display device or the like (step S21). A user of the combustion system 20 can refer to the cause displayed on the display device to identify an actual flame failure detection cause, and to inspect, maintain, or repair the combustion system 20 in an attempt to eliminate the identified cause.

The actual cause identified by the user is input to the combustion monitoring device 79 (step S22). The combustion monitoring device 79 generates the training data in which the input cause is used as an objective variable and the sensing data sent to the cause estimation system 10 together with the above inquiry is used as an explanatory variable, and supplies the generated training data to the cause estimation system 10 via the network NW (step S23). The objective variable or explanatory variable may include the cause output from the estimation model ML and returned to the combustion monitoring device 79 as described above, or the correctness or wrongness of the cause and the actual cause.

The training data acquisition unit 11A acquires the training data supplied from the combustion monitoring device 79 (step S15).

The machine learning unit 11B performs machine learning based on the training data acquired by the training data acquisition unit 11A and constructs a new estimation model ML in which a learning result is reflected (step S16). In this way, the estimation model ML is updated or reconstructed based on latest training data, and the cause estimation accuracy is improved. The constructed estimation model ML is used for subsequent cause estimation. The training data acquisition unit 11A may store the acquired training data in the storage device 13 and perform machine learning at a stage where a certain amount of training data is stored.

In the above, the machine learning and operation of the estimation model ML are performed at the same time, but the estimation model ML may be separated into a machine learning stage and an operation stage. At the machine learning stage, it is only necessary to supply the cause estimation system 10 with training data in which the actual flame failure detection cause identified by the user is used as the objective variable without making the inquiry. The training data acquisition unit 11A may store the training data in the storage device 13 and perform machine learning to construct the estimation model ML when a certain amount of training data is stored. In the operation stage, the inquiry may be made alone. An initial estimation model ML may be constructed in the above machine learning stage, and then the machine learning and operation of the estimation model ML may be performed at the same time.

As described above, in this embodiment, the estimation model ML is constructed (generated) by the machine learning, and the flame failure detection cause is estimated by this estimation model. Therefore, the flame failure detection cause can be accurately estimated.

The sensing data input to the estimation model ML includes at least one of the flame voltage FV (which may be the flame current) and the flame level FL. Since the flame voltage and the flame level are closely related to the above cause, the cause estimation accuracy can be made high. The temperature detected by the thermometer 46, the fuel flow rate and the air flow rate detected by the flow meters 56 and 66, and the like are also related to the flame failure detection cause. Therefore, by including such information in the sensing data input to the estimation model ML, the cause estimation accuracy can be further improved.

As described above, the estimation model ML outputs the different causes depending on whether the value of the flame voltage FV (which may be the flame current) in the predetermined time period transitions within the predetermined range Z or whether the value of the flame voltage FV (which may be the flame current) transitions at the certain reference value (Th1) or below. The different causes may be output depending on a combination of the results of the former determination and the latter determination. Accordingly, the cause is accurately estimated.

As described above, the cause output from the estimation model ML may include the erroneous detection cause when a flame failure is erroneously detected. Since the flame failure detection based on the flame voltage FV actually includes the erroneous detection, the above configuration improves the cause estimation accuracy.

As described above, the training data acquisition unit 11A may acquire the training data from the plurality of combustion systems 20. The flame failure detection is a phenomenon that is usually difficult to occur. Therefore, by collecting the training data from the plurality of combustion systems 20, a highly accurate estimation model ML can be obtained.

(Modifications)

The configuration of the above embodiment can be freely changed. Modifications are exemplified below. The modifications can also be combined at least in part.

(Modification 1)

The training data may be obtained from one combustion system. In this case, the cause estimation system 10 may be provided as a part of the combustion monitoring device 79. In addition, the training data from different types of combustion systems 20 may be used for the machine learning for constructing one estimation model ML as long as the estimation accuracy does not deteriorate significantly.

(Modification 2)

In the above description, the flame voltage is used as the flame state data that indicates the flame state of the main burner 42, which is used for detecting the flame failure. Alternatively, other physical quantity data may be used as the flame state data. The flame level may be used as the flame state data.

(Modification 3)

The cause estimation unit 11C may output the cause acquired from the estimation model ML to the outside, and may send the cause to the combustion monitoring device 79, or may directly display the cause on any display device (for example, a display device of the combustion monitoring device 79 when the cause estimation system 10 is provided as a part of the combustion monitoring device 79), for example. The cause estimation unit 11C may output the cause to a user terminal or the like, and display the cause on the terminal.

(Modification 4)

Each device and hardware of the system described above may also be implemented freely. At least a part of the training data acquisition unit 11A, the machine learning unit 11B, the cause estimation unit 11C, or the estimation model ML may be implemented by various logic circuits such as an application specific integrated circuit (ASIC) and a field-programmable gate array (FPGA).

Each of the above devices includes systems in each of which components of the system are separately housed in a plurality of housings in addition to devices in each of which components of the device are housed in one housing. The system includes devices in each of which components of the device are housed in one housing in addition to systems in each of which components of the system are separately housed in a plurality of housings. The programs may be recorded in a non-transitory computer-readable storage medium such as the above storage device 13. The above status values and the like may be recorded in another storage unit such as a RAM, which is a volatile storage device, only for a certain time period.

For example, the combustion device 30 may be of a type including only the main burner 42 without the pilot burner 43. In addition, the combustion device 30 may be in a state in which the pilot burner 43 is always ignited. In this case, a flame detector for the main burner 42 and a flame detector for the pilot burner 43 may be prepared.

(Modification 5)

Other fuels such as liquid fuel and gas-liquid mixed fuel may be used instead of the fuel gas.

(Range of the Invention)

Although the present disclosure has been described with reference to the embodiment and modifications, the present disclosure is not limited to the above embodiment and modifications. For example, the present disclosure includes various variations to the above embodiment and modifications that can be understood by those skilled in the art within the scope of the technical idea of the present disclosure. The configurations described in the above embodiment and modifications can be appropriately combined within a consistent range.

DESCRIPTION OF REFERENCE NUMERALS AND SIGNS

10: cause estimation system, 11: processor, 11A: training data acquisition unit, 11B: machine learning unit, 11C: cause estimation unit, 13: storage device, 14: display, 15: operation device, 16: communication module, 20: combustion system, 30: combustion device, 40: combustion equipment, 41: combustion furnace, 42: main burner, 43: pilot burner, 44: ignition device, 45: flame detector, 46: thermometer, 50: fuel supply system, 54A, 54B: main valve, 54C, 54D: pilot valve, 55: damper, 56: fuel flow meter, 60: air supply system, 65: damper, 66: air flow meter, 71: combustion control device, 75: temperature regulator, 79: combustion monitoring device, M: control motor, MS: opening degree sensor, ML: estimation model.

The invention claimed is:

1. A cause estimation system comprising:

a training data acquisition circuit that acquires training data including sensing data used as an explanatory variable and a flame failure detection cause used as an objective variable, the sensing data being sensed in a combustion system during a time period immediately preceding, by a predetermined time, detection of each of first flame failures detected based on flame state data indicating a flame state of a burner in the combustion system, and the flame failure detection cause including an erroneous detection cause when at least one of the first flame failures is erroneously detected;

a machine learning circuit that performs machine learning based on the training data acquired by the training data acquisition circuit and that constructs an estimation model in which a learning result is reflected;

a cause estimation circuit that inputs sensing data sensed in the combustion system during a time period immediately preceding, by the predetermined time, detection of a second flame failure into the estimation model when the second flame failure occurs and that acquires a flame failure detection cause associated with the second flame failure output from the estimation model; and an output circuit that outputs the flame failure detection cause associated with the second flame failure acquired by the cause estimation circuit;

wherein the flame state data is a potential difference between both ends of a resistor through which a discharge current flows when a discharge tube of a flame detector discharges due to a flame of the burner, or a value obtained by integrating the discharge current, and the sensing data includes at least one of the flame state data and a flame level indicating discharge frequency of the flame detector.

2. The cause estimation system according to claim 1, wherein the flame failure is detected when a value of the flame state data becomes less than a predetermined threshold value, the sensing data includes at least the flame state data, and the estimation model outputs the different causes depending on whether the value of the flame state data in the time period transitions within a predetermined range and/or whether the value of the flame state data transitions at a certain reference value or below.

3. The cause estimation system according to claim 2, wherein the training data acquisition circuit acquires the training data from a plurality of combustion systems.

4. The cause estimation system according to claim 1, wherein the training data acquisition circuit acquires the training data from a plurality of combustion systems.

5. A non-transitory computer-readable storage medium storing a program that causes a computer to execute:

acquiring training data including sensing data used as an explanatory variable and a flame failure detection cause used as an objective variable, the sensing data being sensed in a combustion system during a time period immediately preceding, by a predetermined time, detection of each of first flame failures detected based on flame state data indicating a flame state of a burner in the combustion system, and the flame failure detection cause including an erroneous detection cause when at least one of the first flame failures is erroneously detected;

performing machine learning based on the training data acquired and constructing an estimation model in which a learning result is reflected;

inputting sensing data sensed in the combustion system during a time period immediately preceding, by the predetermined time, detection of a second flame failure into the estimation model when the second flame failure occurs and acquiring a flame failure detection cause associated with the second flame failure output from the estimation model; and outputting the flame failure detection cause associated with the second flame failure;

wherein the flame state data is a potential difference between both ends of a resistor through which a discharge current flows when a discharge tube of a flame detector discharges due to a flame of the burner, or a value obtained by integrating the discharge current, and the sensing data includes at least one of the flame state data and a flame level indicating discharge frequency of the flame detector.

6. A model construction method executed by a computer system that performs machine learning and that constructs an estimation model, the model construction method comprising:

acquiring training data including sensing data used as an explanatory variable and a flame failure detection cause used as an objective variable, the sensing data being sensed in a combustion system during a time period immediately preceding, by a predetermined time, detection of each of first flame failures detected based on flame state data indicating a flame state of a burner in the combustion system, and the flame failure detection cause including an erroneous detection cause when at least one of the first flame failures is erroneously detected; and performing machine learning based on the training data acquired and constructing an estimation model in which a learning result is reflected in the computer system;

inputting sensing data sensed in the combustion system during a time period immediately preceding, by the predetermined time, detection of a second flame failure into the estimation model when the second flame failure occurs and acquiring a flame failure detection cause associated with the second flame failure output from the estimation model; and outputting the flame failure detection cause associated with the second flame failure;

wherein the flame state data is a potential difference between both ends of a resistor through which a discharge current flows when a discharge tube of a flame detector discharges due to a flame of the burner, or a value obtained by integrating the discharge current, and the sensing data includes at least one of the flame state data and a flame level indicating discharge frequency of the flame detector.

* * * * *